(12) United States Patent
Brita et al.

(10) Patent No.: US 9,127,095 B2
(45) Date of Patent: Sep. 8, 2015

(54) CATALYST COMPONENTS FOR THE POLYMERIZATION OF OLEFINS AND CATALYSTS THEREFROM OBTAINED

(75) Inventors: Diego Brita, Ferrara (IT); Gianni Collina, Ferrara (IT); Daniele Evangelisti, Ferrara (IT); Anna Fait, Ferrara (IT); Benedetta Gaddi, Ferrara (IT); Giampiero Morini, Padua (IT); Pietro Baita, S. Maria Maddalena (IT); Lorella Marturano, Ferrara (IT); Harry Mavridis, Lebanon, OH (US)

(73) Assignee: Basell Poliolefine Italia S.r.l., Milan (IT)

( * ) Notice: Subject to any disclaimer, the term of this patent is extended or adjusted under 35 U.S.C. 154(b) by 435 days.

(21) Appl. No.: 13/517,038

(22) PCT Filed: Dec. 17, 2010

(86) PCT No.: PCT/EP2010/070033
§ 371 (c)(1),
(2), (4) Date: Jun. 18, 2012

(87) PCT Pub. No.: WO2011/076675
PCT Pub. Date: Jun. 30, 2011

(65) Prior Publication Data
US 2012/0259078 A1    Oct. 11, 2012

Related U.S. Application Data

(60) Provisional application No. 61/284,679, filed on Dec. 23, 2009.

(30) Foreign Application Priority Data

Jan. 11, 2010    (EP) .................................... 10150413

(51) Int. Cl.
    *C08F 4/76*     (2006.01)
    *C08F 4/646*    (2006.01)
    *C08F 4/649*    (2006.01)
    *C08F 110/02*   (2006.01)
    *C08F 10/00*    (2006.01)

(52) U.S. Cl.
    CPC .............. *C08F 10/00* (2013.01); *C08F 110/02* (2013.01); *C08F 2410/03* (2013.01)

(58) Field of Classification Search
    CPC ............... C08F 4/022; C08F 4/76; C08F 4/16
    See application file for complete search history.

(56) References Cited

U.S. PATENT DOCUMENTS

| | | | |
|---|---|---|---|
| 3,953,414 | A | 4/1976 | Galli et al. |
| 4,399,054 | A | 8/1983 | Ferraris |
| 4,447,587 | A | 5/1984 | Berthold et al. |
| 4,469,648 | A | 9/1984 | Ferraris |
| 4,562,170 | A * | 12/1985 | Graves .................... 502/113 |
| 4,829,034 | A | 5/1989 | Iiskolan |
| 5,100,849 | A | 3/1992 | Miya |
| 7,307,035 | B2 | 12/2007 | Sacchetti et al. |

FOREIGN PATENT DOCUMENTS

| | | |
|---|---|---|
| CN | 1610704 | 4/2005 |
| CN | 101472957 | 7/2009 |
| EP | 0273208 | 7/1988 |
| WO | WO-9844009 | 10/1998 |
| WO | WO-2008077770 | 7/2008 |
| WO | WO-2010076255 | 7/2010 |

OTHER PUBLICATIONS

Ohnishi, R et al., "Effect of the allyl-3,4 dimethoxybenzene on the copolymerization of propene and small amount of ethylene with the TCL4/dibutylphatalate (DBP)/MGCL2 catalyst activated by al (I-C4H9)3", Polymer Bulletin, Springer, Heidelberg, DE—vol. 41 No. 6 Dec. 1, 1998 , 653-660.

* cited by examiner

*Primary Examiner* — Ling Choi
*Assistant Examiner* — Catherine S Branch

(57) ABSTRACT

Catalyst component comprising Mg, Ti, and halogen atoms, and is characterized in that (a) the Ti atoms are present in an amount higher than 4% based on the total weight of the said catalyst component, (b) the amount of Mg and Ti atoms is such that the Mg/Ti molar ratio is higher than 2 and (c) by a X-ray diffraction spectrum, in which, in the range of 2θ diffraction angles between 47° and 52°, at least two diffraction lines are present at diffraction angles 2θ of 48.3±0.2°, and 50.0±0.2°, the most intense diffraction lines being the one at 2θ of 50.0±0.2°, the intensity of the other diffraction line being equal to or lower than the intensity of the most intense diffraction line.

15 Claims, No Drawings

CATALYST COMPONENTS FOR THE POLYMERIZATION OF OLEFINS AND CATALYSTS THEREFROM OBTAINED

This application is the U.S. national phase of International Application PCT/EP2010/070033, filed Dec. 17, 2010, claiming priority to European Application 10150413.2 filed Jan. 11, 2010, and the benefit under 35 U.S.C. 119(e) of U.S. Provisional Application No. 61/284,679, filed Dec. 23, 2009; the disclosures of International Application PCT/EP2010/070033, European Application 10150413.2 and U.S. Provisional Application No. 61/284,679, each as filed, are incorporated herein by reference.

The present invention relates to catalyst components for the polymerization of olefins $CH_2=CHR$, wherein R is hydrogen or hydrocarbon radical having 1-12 carbon atoms. In particular, the invention relates to catalyst components suitable for the preparation of homopolymers and copolymers of ethylene having a broad molecular weight distribution (MWD) and to the catalysts obtained therefrom.

In particular the present invention relates to a solid catalyst component, comprising titanium, magnesium and halogen characterized by a specific chemical composition which is suitable to prepare ethylene polymers having a set of properties making them particularly suitable for blow molding applications, especially for preparation of large blow molding items. This specific application field is very demanding for ethylene polymers which, in order to be suitable for this end use, need to show properties such as broad molecular weight distribution (MWD), proper melt strength/swell balance and ESCR.

The breath of molecular weight distribution (MWD) of the ethylene polymers can be expressed by a high melt flow ratio (F/E or F/P) value, which is the ratio between the melt index measured with a 21.6 Kg load (melt index F) and the melt index measured with a 2.16 Kg load (melt index E), or 5 Kg load (Melt Index P) determined at 190° C. according to ASTM D-1238. The MWD affects the rheological behavior, the processability of the melt and also the final ESCR properties. Polyolefins having a broad MWD, particularly coupled with relatively high average molecular weight, are preferred in high speed extrusion processing where polymers having a not proper MWD could cause melt fracture and higher shrinkage/warpage of the final items. However, it has been proven to be a very difficult task to obtain polymers combining broad MWD with a proper melt strength/swell balance. This is because MWD also affects melt strength and swell behavior in a different way.

One way of obtaining polymers with broad MWD is to prepare them via multi-step process based on the production of different molecular weight polymer fractions in single stages, sequentially forming macromolecules with different length on the catalyst particles. The control of the molecular weight obtained in each step can be carried out according to different methods, for example by varying the polymerization conditions or the catalyst system in each step, or by using a molecular weight regulator. Regulation with hydrogen is the preferred method either working in solution or in gas phase.

A problem typically associated with the above described multistep processes is that the different polymerization conditions used in the various stages can lead to the production of not sufficiently homogenous products, especially in cases where ethylene (co)polymers with very broad molecular weight distributions are to be produced. It is in fact difficult to obtain products having a high F/E ratio, for example higher than 100, which when subject to a transformation process yield products with a low number of unmelt particles (gels).

In order to solve or minimize this problem, it would be important to have a catalyst capable of producing a medium/broad MWD polymers also in a single polymerization step so as to minimize the use of different amounts of hydrogen in the two polymerization step.

Moreover, as the use of hydrogen has a depressive effect on the catalyst activity it would be very important for the catalyst to possess a high polymerization activity.

In addition, it would also be advisable that the catalyst be capable to work successfully under gas-phase polymerization conditions, as this kind of technique is nowadays the most effective, advantageous and reliable technology. This means that the catalyst needs to have a good morphological stability preventing its improper fragmentation and consequent formation of fines particle responsible of plant operation problems such as hot spots, reactor sheeting, plugging etc.

Catalyst systems capable to produce ethylene polymers with broad molecular weight distribution are described in U.S. Pat. No. 4,447,587. The catalyst is obtained by reacting magnesium alcoholates with titanium tetrachloride at a relatively low temperature and by subjecting the so obtained reaction mixture to a long heat treatment at a fairly high temperature in order to split off alkyl chlorides.

The magnesium alcoholates are therefore first reacted typically with a molar excess of $TiCl_4$ at a temperature ranging from 50 to 100° C. and then subject to a heat treatment carried out at temperature ranging from 110° C. to 200° C. for a time span said to be in the range from 10 to 100 hours. After filtering and washing the solid obtained shows a composition in which the Cl/Ti atomic ratio is lower than 3 and the Ti/Mg molar ratio is typically higher than 1.

The so obtained catalyst is able to offer broad molecular weight distribution but in view of its irregular morphology it is not possible to use it in gas-phase polymerization. Moreover, it has been found that this catalyst is able to prepare suitable products for blow molding and in particular for large blow molding only when it is used in combination with tri-isoprenyl aluminum as cocatalyst. This is a drawback in plant operation because this cocatalyst, which is not the best choice for making other products, it would make necessary to transition from one cocatalyst to another when changing polymer grade with the negative consequence of producing a substantial amount of off-spec product.

Moreover, its good performances are evident only if a preactivation step with a chlorinated aluminum compound is carried out, which makes the entire process of catalyst production more burdensome.

Catalysts suitable for use in polymerization processes for the production of broad MWD polyethylenes are described in WO2008/077770. The catalysts are obtained by a method which comprises a step (a) in which a compound $MgCl_2 \cdot mR^{II}OH \cdot tH_2O$, wherein $0.3 \leq m \leq 1.7$, t is from 0.01 to 0.6, and $R^{II}$ is an alkyl, cycloalkyl or aryl radical having 1-12 carbon atoms is reacted with a titanium compound of the formula $Ti(OR^I)_nX_{y-n}$, in which n is comprised between 0 and 0.5, y is the valence of titanium, X is halogen and $R^I$ is preferably an alkyl radical having 1-8 carbon atoms, in the presence of an aluminum compound which is preferably $AlCl_3$. The catalysts are characterized by a porosity, measured by the mercury method and due to pores with radius equal to or lower than 1 μm, which is at least 0.3 cm$^3$/g and by the fact that the Cl/Ti molar ratio is lower than 29. Moreover, the Mg/Al molar ratio ranges from 1 to 35 and by a "LA" factor higher than 0.5, where the "LA" factor is the molar equivalent of anionic species lacking in order to satisfy all the molar equivalents of the cations present in the solid catalyst component which are not been satisfied by the total molar equivalent of the anions present in the solid catalyst component, all of the molar equivalents of anions and cations being referred to the Ti molar amount. The catalyst disclosed in said document is indeed effective in producing in high yield polymers with broad MWD and it is also endowed with a good morphological stability. However, the polymers obtained have a melt strength/swell balance not suitable for blow molding application.

In particular when the polyethylene exhibits too little swell, it can become difficult or impossible to properly fill the extremities of the mold, such as the handle of a blow-molded bottle. Melt strength determines how much deformation and sag the parison will experience as it is being formed before mold closing and inflation. As the melt leaves the die, it extends and this parison sag influences parison dimensions. High melt strength is necessary for many applications. While both high melt strength and high extrudate swell are desirable, generally extrudate swell decreases with increasing melt strength.

U.S. Pat. No. 3,953,414 describes catalyst components having good morphological stability obtained by spraying, a hydrated Mg dihalide in the molten state or dissolved in water, and more particularly molten $MgCl_2 \cdot 6H_2O$ having sizes comprised in general between 1 and 300 micron, preferably 30 to 180 micron, subsequently subjecting said particles to a controlled partial dehydration to bring the water of crystallization content thereof to a value below 4 moles of $H_2O$ per mole of the Mg dihalide while avoiding hydrolysis of the Mg dihalide, thereafter reacting the partially dehydrated Mg dihalide particles in a liquid medium comprising a halogenated Ti compound, more particularly $TiCl_4$, heated to a temperature generally higher than 100° C., and finally removing the unreacted Ti compound from the Mg dihalide particles, by further reaction with hot $TiCl_4$. The document does not indicate whether the catalyst is suitable to produce broad MWD polymers or whether such polymers are suitable for blow molding. However, it is apparent that the polymerization activity is not sufficient.

It has now surprisingly been found solid catalyst components which are able to produce, with higher polymerization activity, ethylene polymers with a broad molecular weight distribution and suitable properties for blow molding application. It is important to note that the catalyst components have high morphological stability and can advantageously be used in gas phase polymerization processes. Said catalyst components comprise Mg, Ti, and halogen atoms, and are characterized in that (a) the Ti atoms are present in an amount higher than 4% based on the total weight of the said catalyst component, (b) the amount of Mg and Ti atoms is such that the Ti/Mg molar ratio is lower than 1 and (c) by a X-ray diffraction spectrum, in which, in the range of 2θ diffraction angles between 47.0° and 52.0°, at least two diffraction peaks are present at diffraction angles 2θ of 48.0±0.2°, and 50.2±0.2°.

Generally, the most intense diffraction peak is the one at 2θ of 50.2±0.2°. Preferably, the intensity of the other diffraction line being less than 0.8 times the intensity of the most intense diffraction line.

Preferably in the X-ray diffraction spectrum, in the range of 2θ diffraction angles between 23° and 28°, at least one diffraction peak is present at diffraction angles 2θ of 25.3±0.2°. Most preferably, such intensity being less than 0.8 times the intensity of the diffraction peak at 2θ diffraction angles of 48.0±0.2°.

Still more preferably another diffraction peak is present at diffraction angles 2θ of 12.5±0.2° preferably having intensity less than 0.9 times the intensity of the diffraction peak at 28θ diffraction angles of 25.3±0.2°.

Preferably, the Ti/Mg molar ratio is equal to, or lower than, 0.9 and more preferably it ranges from 0.85 to 0.14. The amount of titanium atoms is preferably higher than 4.5% more preferably higher than 5.5% and especially higher than 7% wt. According to a preferred embodiment, more than 80% of the titanium atoms are in a +4 valence state and, more preferably, substantially all the titanium atoms are in such a valence state. Throughout the present application the wording "substantially all the titanium atoms are in valence state of 4" means that at least 95% of the Ti atoms have a valence state of 4.

In dependence of their preparation process the catalyst of the invention may contain residual amounts of OR groups, in which R is a C1-C20 hydrocarbon group.

The catalyst component of the present invention shows also another additional interesting feature. The amount of total anions that are detected, according to the below reported methods, on the solid catalyst component are usually not enough to satisfy the total of positive valences deriving from the cations including, but not limited to, Mg, Ti even taking into account the possible presence of OR groups. In other words, it has been noticed that in the catalyst of the invention a certain amount of anions is often lacking in order to have all the valences of the cations satisfied. According to the present invention, this lacking amount is defined as "LA" factor where "LA" factor is the molar equivalent of anionic species lacking in order to satisfy all the molar equivalents of the cations present in the solid catalyst component which have not been satisfied by the total molar equivalent of the anions present in the solid catalyst component, all of the molar equivalents of anions and cations being referred to the Ti molar amount.

The LA factor is determined by first determining the molar contents of all the anions and cations detected by the analysis. Then, the molar content relative to all of the anions (including but not limited to $Cl^-$ and $^-OR$) and cations (including but not limited to Mg, and Ti) is referred to Ti by dividing it for the Ti molar amount which is therefore considered as the molar unity. Afterwards, the total number of molar equivalents of cations to be satisfied is calculated for example by multiplying the molar amount of $Mg^{++}$ (referred to Ti) by two and the molar amount of $Ti^{+4}$ (molar unity) by four. The so obtained total value is then compared with the sum of the molar equivalents deriving from anions, for example Cl and OR groups, always referred to titanium. The difference resulting from this comparison, and in particular the negative balance obtained in terms of anion molar equivalents, indicates the LA factor. The "LA" factor is usually higher than 0.5, preferably higher than 1 and more preferably in the range from 1.5-6.

Without being construed as a limiting interpretation of the invention, it is possible that the LA factor is related to the formation of compounds in which two or more metal atoms are coupled by [—O—] bridges.

Preferably the catalyst component of the invention comprises a Ti compound having at least one Ti-halogen bond supported on magnesium chloride. The preferred titanium compounds have the formula $Ti(OR^{III})_n X_{4-n}$, wherein n is a number comprised between 0 and 1 inclusive, $R^{III}$ is an alkyl, cycloalkyl or aryl radical having 2-8 carbon atoms and X is halogen, which are preferably combined with some amounts of $TiOCl_2$ compounds that can be detected either via RX determination or inferred through the LA factor. In particular $R^{III}$ can be n-butyl, isobutyl, 2-ethylhexyl, n-octyl and phenyl; X is preferably chlorine. Preferred titanium compounds are $TiCl_4$ and $TiCl_3OEt$.

It is also possible that the catalyst component of the invention contains additional transition metal compounds and particularly Hf derivatives. Preferred hafnium compounds have the formula $Hf(OR^V)_nX_{4-n}$, wherein n is a number comprised between 0 and 1 inclusive, $R^V$ is an alkyl, cycloalkyl or aryl radical having 2-8 carbon atoms and X is halogen. In particular $R^V$ can be n-butyl, isobutyl, 2-ethylhexyl, n-octyl and phenyl; X is preferably chlorine. $HfCl_4$ is the most preferred.

The components of the invention may also comprise an electron donor compound (internal donor), selected for example among ethers, esters, amines and ketones.

The preparation of the solid catalyst component can be carried out according to several methods.

According to a preferred general method, the solid catalyst component can be prepared by reacting a titanium compound of the formula disclosed above with a magnesium chloride deriving from an adduct of formula $MgCl_2 \cdot pH_2O$, where p is a number between 0.1 and 6, preferably from 0.5 to 3.5, and preferably from 1 to 3. The adduct can be suitably prepared in spherical form by mixing water and magnesium chloride, and then by spraying the solution via spray-cooling technique thereby obtaining the spherical $MgCl_2 \cdot pH_2O$ particles that, if desired, can be partially dried to lower the water content.

According to another embodiment, the $MgCl_2 \cdot pH_2O$, adduct can be obtained by hydration of porous $MgCl_2$ which is in turn obtained by thermally dealcoholating $MgCl_2 nEtOH$ adducts in which n is from 1 to 6.

Adducts of this type can generally be obtained by mixing alcohol and magnesium chloride in the presence of an inert hydrocarbon immiscible with the adduct, operating under stirring conditions at the melting temperature of the adduct (100-130° C.). Then, the emulsion is quickly quenched, thereby causing the solidification of the adduct in form of spherical particles. Representative methods for the preparation of these spherical adducts are reported for example in U.S. Pat. No. 4,469,648, U.S. Pat. No. 4,399,054, and WO98/44009. Another useable method for the spherulization is the spray cooling described for example in U.S. Pat. Nos. 5,100,849 and 4,829,034.

Generally these dealcoholated adducts are also characterized by a porosity (measured by mercury method) due to pores with radius due to pores with radius up to 0.1 μm ranging from 0.15 to 2.5 cm³/g preferably from 0.25 to 1.5 cm³/g.

Water can be gradually added to these adducts kept in motion until the desired water/Mg ratio is obtained.

The reaction with the Ti compound is preferably carried out under conditions such that the proper amount and type of titanium compound is left on the $MgCl_2$ support. To this end it has been found preferable caning out the process by suspending the $MgCl_2 \cdot pH_2O$ adduct in cold $TiCl_4$ (generally from −5 to 0° C.) and then heating the mixture to 120-140° C. and keep it at this temperature for 2.5-10 hours. After that, the temperature can be reduced at about 80-100° C. and the mixture let to react for additional 1-100 minutes. Thereafter, the liquid phase is removed and the solid washed with inert hydrocarbon.

The total porosity of the catalysts obtained with this method is generally comprised between 0.15 and 1.2 cm³/g.

The surface area measured by the BET method and relative to the catalyst obtained by the last general method is generally lower than 150 and in particular comprised between 30 and 70 m²/g. The porosity measured by the BET method is generally comprised between 0.1 and 0.5, preferably from 0.15 to 0.4 cm³/g.

Moreover, when obtained from the last general method the particles of the solid component have substantially spherical morphology and average diameter comprised between 5 and 150 μm. As particles having substantially spherical morphology, those are meant wherein the ratio between the greater axis and the smaller axis is equal to or lower than 1.5 and preferably lower than 1.3. This allows the preparation of both components with a small average particle size (in the range of 5-20 μm) useful for slurry polymerization and components with a medium large particle size (over 30 μm) particularly suitable for gas-phase polymerization. Also the particle size distribution is narrow being the SPAN of the catalyst particles comprised between 0.7 and 1.3 preferably from 0.8 to 1.2. The SPAN being defined as the value of the ratio $$\frac{P90 - P10}{P50},$$

wherein P90 is the value of the diameter such that 90% of the total volume of particles have a diameter lower than that value; P10 is the value of the diameter such that 10% of the total volume of particles have a diameter lower than that value and P50 is the value of the diameter such that 50% of the total volume of particles have a diameter lower than that value.

The catalyst components of the invention form catalysts, for the polymerization of alpha-olefins $CH_2=CHR^{VIII}$ wherein $R^{VIII}$ is hydrogen or a hydrocarbon radical having 1-12 carbon atoms by reaction with organo-Al compounds. In particular preferred are Al-trihydrocarbyl compounds such as trialkyl compounds and trialkenyl compounds. Non limitative examples are Al-trimethyl, Al-triethyl, Al-tri-n-butyl, Al-triisobutyl and isopropyl aluminum and triisoprenyl aluminum. The Al/Ti ratio is generally comprised between 20 and 800.

If desired, an external donor can be used in the preparation of the catalyst system or added directly in the polymerization reactor.

The external donor is preferably selected from those of the following formula

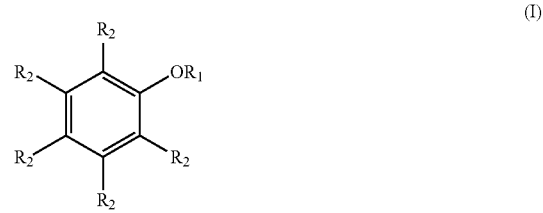

(I)

wherein:

$R_2$, equal to or different from each other, are hydrogen atoms or $C_1$-$C_{20}$ hydrocarbon radicals optionally containing heteroatoms belonging to groups 13-17 of the periodic table of the elements or alkoxy groups of formula $-OR_1$, two or more of the $R_2$ groups can be connected together to form a cycle; $R_1$ are $C_1$-$C_{20}$ hydrocarbon radicals optionally containing heteroatoms belonging to groups 13-17 of the periodic table of the elements.

Preferably, at least one of $R_2$ is $-OR_1$.

In general, it is preferred that the two $-OR_1$ groups are in ortho position to each other. Accordingly, 1,2-dialkoxy-benenes, 2,3-alkyldialkoxybenzenes or 3,4-alkyldialkoxy-benzenes are preferred. The other $R_2$ groups are preferably selected from hydrogen, C1-C5 alkyl groups and $OR_1$ groups. When two $R_2$ are alkoxygroup $OR_1$, a trialkoxybenzene derivative is obtained and in this case the third alkoxy may be vicinal (ortho) to the other two alkoxy or in meta position with respect to the closest alkoxygroup. Preferably, $R_1$ is selected from C1-C10 alkyl groups and more preferably from C1-C5 linear or branched alkyl groups. Linear alkyls are preferred. Preferred alkyls are methyl, ethyl, n-propyl, n-butyl and n-pentyl.

When one or more of the $R_2$ is a C1-C5 linear or branched alkyl groups, alkyl-alkoxybenzenes are obtained. Preferably, $R_2$ is selected from methyl or ethyl. According to a preferred embodiment one of the $R_2$ is methyl.

One of the preferred subclasses is that of the dialkoxytoluenes, among this class preferred members are 2,3-dimethoxytoluene, 3,4-dimethoxytoluene, 3,4-diethoxytoluene, 3,4,5 trimethoxytoluene.

The components of the invention, preferably in spherical form, and catalysts obtained therefrom find applications in the processes for the preparation of several types of olefin polymers.

For example the following can be prepared: high density ethylene polymers (HDPE, having a density higher than 0.940 g/cm$^3$), comprising ethylene homopolymers and copolymers of ethylene with alpha-olefins having 3-12 carbon atoms; linear low density polyethylene's (LLDPE, having a density lower than 0.940 g/cm$^3$) and very low density and ultra low density (VLDPE and ULDPE, having a density lower than 0.920 g/cm$^3$, to 0.880 g/cm$^3$ cc) consisting of copolymers of ethylene with one or more alpha-olefins having from 3 to 12 carbon atoms, having a mole content of units derived from the ethylene higher than 80%; elastomeric copolymers of ethylene and propylene and elastomeric terpolymers of ethylene and propylene with smaller proportions of a diene having a content by weight of units derived from the ethylene comprised between about 30 and 70%, isotactic polypropylenes and crystalline copolymers of propylene and ethylene and/or other alpha-olefins having a content of units derived from propylene higher than 85% by weight; shock resistant polymers of propylene obtained by sequential polymerization of propylene and mixtures of propylene with ethylene, containing up to 30% by weight of ethylene; copolymers of propylene and 1-butene having a number of units derived from 1-butene comprised between 10 and 40% by weight. However, as previously indicated they are particularly suited for the preparation of broad MWD polymers and in particular of broad MWD ethylene homopolymers and copolymers containing up to 20% by moles of higher α-olefins such as propylene, 1-butene, 1-hexene, 1-octene.

In particular the catalysts of the invention are able to give ethylene polymers, also in a single polymerization step, with a broad molecular weight distribution as evidenced by the high ratio of the F/P ratio, defined as mentioned above, and also endowed with a suitable set of properties for the blow molding application.

The catalysts of the invention can be used in any kind of polymerization process both in liquid and gas-phase processes. Catalysts in which the solid catalyst component has small average particle size, such as less than 30 μm, preferably ranging from 5 to 20 μm, are particularly suited for slurry polymerization in an inert medium, which can be carried out continuously in stirred tank reactor or in loop reactors. In a preferred embodiment the solid catalyst components having small average particle size as described are particularly suited for the use in two or more cascade loop or stirred tank reactors producing polymers with different molecular weight and/or different composition in each reactor. Catalysts in which the solid catalyst component has medium/large average particle size such as at least 30 μm and preferably ranging from 50 to 100 μm are particularly suited for gas-phase polymerization processes which can be carried out in agitated or fluidized bed gas-phase reactors.

The following examples are given in order to further describe and not to limit the present invention.

The properties are determined according to the following methods:

Porosity and surface area with nitrogen: are determined according to the B.E.T. method (apparatus used SORPTOMATIC 1900 by Carlo Erba).

Porosity and surface area with mercury:

The measure is carried out using a "Porosimeter 2000 series" by Carlo Erba.

The porosity is determined by absorption of mercury under pressure. For this determination use is made of a calibrated dilatometer (diameter 3 mm) CD$_3$ (Carlo Erba) connected to a reservoir of mercury and to a high-vacuum pump ($1 \cdot 10^{-2}$ mbar). A weighed amount of sample is placed in the dilatometer. The apparatus is then placed under high vacuum (<0 1 mm Hg) and is maintained in these conditions for 20 minutes. The dilatometer is then connected to the mercury reservoir and the mercury is allowed to flow slowly into it until it reaches the level marked on the dilatometer at a height of 10 cm. The valve that connects the dilatometer to the vacuum pump is closed and then the mercury pressure is gradually increased with nitrogen up to 140 kg/cm$^2$. Under the effect of the pressure, the mercury enters the pores and the level goes down according to the porosity of the material. The porosity (cm$^3$/g), both total and that due to pores up to 1 μm, the pore distribution curve, and the average pore size are directly calculated from the integral pore distribution curve which is function of the volume reduction of the mercury and applied pressure values (all these data are provided and elaborated by the porosimeter associated computer which is equipped with a "MILESTONE 200/2.04" program by C. Erba.

MIE flow index: ASTM-D 1238
MIF flow index: ASTM-D 1238
MIP flow index ASTM-D 1238
Bulk density: DM-53194
Effective density: ASTM-D 792
X-ray diffraction spectra X-ray diffraction spectra were collected by using Bruker D8 Advance powder diffractometer. The spectra have been recorded by using the CuKα$_1$(λ=1,5405 Å) in the range of 2Θ from 5° to 60° with incremental step of 0.2° and collection time of 12 seconds. The instrument was calibrated using the ASTM 27-1402 standard for Silicon. During the acquisition of the X-ray pattern, the samples were enclosed into tailor made and airtight sample holder able to maintain the powders into N$_2$ atmosphere.

Swell Determination

Zero-land die swell (So) is used to quantify the extent of extrudate swell for a sample extruded through a die with essentially zero land length. To measure So, a sample is loaded into an Instron 3211 capillary rheometer, melted at 190° C., then extruded through a cylindrical die (diameter=0.034"; length=0.0") at a shear rate of 1025 s$^{-1}$. The diameter of the extruded strand is measured using a Laser-Mike micrometer (Model 192-10) attached near the exit of the die. Die swell is reported as the percentage increase of the strand diameter to the orifice diameter.

Melt Strength

Melt Strength is measured rheologically and reported as the value of the complex viscosity (ETA*) in poise at a complex modulus of 2 x 10$^4$ dyn/cm$^2$ and a temperature of 190° C.

(according to J. M. Dealy and K. F. Wissburn, "Melt Rheology and Its Role in Plastics Processing", Van Nostrand Reinhold, New York, 1990).

General Slurry Procedure for ethylene polymerization (HDPE)

Into a 4 liters stainless steel autoclave, degassed under $N_2$ stream at 70° C., 1600 cc of anhydrous hexane, 0.1 g of spherical component and 0.3 g of triisobutylaluminum (Tiba) were introduced. The whole was stirred, heated to 75° C. and thereafter 7 bar of $H_2$ and 7 bar of ethylene were fed. The polymerization lasted 2 hours during which ethylene was fed to keep the pressure constant.

General Procedure for Gas-Phase Ethylene polymerization (HDPE)

A 15.0 liter stainless-steel fluidized reactor equipped with gas-circulation system, cyclone separator, thermal exchanger, temperature and pressure indicator, feeding line for ethylene, propane, hydrogen, and with a 1 L steel reactor for the catalyst pre-polymerization and/or injection of the catalytic system into the fluidized bed reactor.

The gas-phase apparatus was purified by fluxing pure nitrogen at 40° C. for 12 hours and then was circulated a propane (10 bar, partial pressure) mixture containing 0.2 g of TIBA at 80° C. for 30 minutes. It was then depressurized and the reactor washed with pure propane, heated to 85° C. and finally loaded with propane (16 bar partial pressure), ethylene (3.5 bar, partial pressure) and hydrogen (3.5 bar, partial pressure).

In a 100 mL three neck glass flask were introduced in the following order, 20 mL of anhydrous hexane, 1.5 g of TIBA, and 0.19 g of the catalyst component. They were mixed together and stirred at room temperature for 5 minutes and then introduced in the 1-L reactor maintained in a propane flow.

By using a propane overpressure, the activated catalyst was injected into the gas-phase reactor. The final pressure was about 23 bar, and it was kept constant during the polymerization at 85° C. for 120 minutes by feeding ethylene. At the end, the reactor was depressurised and the temperature was dropped to 30° C.

EXAMPLES

Example 1

Preparation of the Spherical $MgCl_2$—$H_2O$ Adduct

A sample of spherical magnesium chloride bi-hydrate complex was prepared in a 150 mm diameter glass fluidized bed reactor. The glass jacketed reactor was equipped with dedicated heating systems for both fluidization nitrogen and for the reactor main body. The fluidization nitrogen flow was kept at 1200 1/h providing a good fluidization of spherical MgCl2*nEtOH support used as starting material. These support having a chemical composition of 45.1% wt. ethyl alcohol, 1,7% wt. water, 53.2% wt magnesium chloride, was loaded into the fluidized bed reactor (5949 g) and warmed up from 60° C. to 110° C. in 3 hrs, and then kept at 110° C. for an extra hour. After that time (at a composition of about 40% EtOH by weight) a calibrated amount of water (1198 g) was added to the reactor by a precise volumetric peristaltic pump, operating at a feed rate of about 100 ml/h. The water was fed directly into the fluidizing (jacketed) nitrogen line, warmed up to 104-106° C. and then introduced to the fluidized reactor. The moist nitrogen stream was measured just below the fluidizing grid, operating between 85 and 94° C., and recorded. The nitrogen enriched in water vapor performed a removal of ethanol from the support, and its replacement with the water itself After about 11.5 hrs of continuous water feeding into the reactor the total desired amount of water was fed, while ethanol was removed out of the reactor by the fluidizing nitrogen. Part of the condensed ethanol was collected in the cyclones section of the nitrogen line after the reactor (no fines or solid is found in the cyclones at the chosen fluidization conditions, and 520 ml of ethanol were trapped and recovered). While ethanol is removed and water introduced on the support, temperature (fluidized bed bulk temperature) rose in the range 97-108° C., most of all in the last part of the preparation, due to exothermal behavior of magnesium chloride reaction with water.

After completion of water adduction, the support is cooled down to room temperature and discharged (4212 g, corresponding to a yield/recovery in magnesium of 96.9% compared to the theoretical expected weight). Chemical analyses showed a residual 0,3% ethanol content by weight, 27.3% wt. of water, and 18% of elemental magnesium.

Preparation of the Solid Component

Into a 40L steel autoclave provided with stirrer, 35L of $TiCl_4$ were introduced together with 1760 g of the spherical support prepared as described above at temperature of 0° C. The slurry was heated and kept under stirring for 4.5h at 135° C. After that, under stirring, the temperature was lowered till to 80° C. and kept constant for further 30'.

Then the stirring was stopped and the liquid siphoned off of the reactor. Six hexane washings (2 at 60° C.+4 at 25° C.) were performed.

The spherical solid component was discharged and dried under vacuum at about 50° C. (1.855g of neat catalyst were recovered).

The composition of the solid was the following:

| | |
|---|---|
| Ti | 11.5% (by weight) |
| Mg | 15.5% (by weight) |
| Cl | 60.8% (by weight) |
| Solv. | 2.90% (by weight) |
| L.A. factor | 2.2 |

X RAY Pattern diffraction of the catalyst prepared in the example (recorded according to the method described in the above text), showed two different peaks at 2θ values of 48.3° and 50.0° respectively and one peak at 2θ values of 25.3°.

Porosity measurements were performed according to the methodology described into the text and results are herewith reported:

| B.E.T. (SORPTOMATIC 1900) | | Porosimeter | | | |
|---|---|---|---|---|---|
| | Surface | 2000 series (Hg) | | | |
| Porosity cc/g | Area $m^2/g$ | Total Por. Cc/g | Total Surf. Area $m^2/g$ | Por. Up to 1 cc/g | Surf. Area up to 1 $m^2/g$ |
| 0.32 | 72.9 | 0.78 | 29.9 | 0.67 | 29.9 |

The so obtained catalyst was evaluated in HDPE polymerization according to the general slurry procedure obtaining 100 g of polymer having the following characteristics:
MIF=1.3g/10'
Bdp=0.381 (morphology Spherical)

Moreover, it was used in the general gas phase polymerization obtaining 135g of polymer which showed the following characteristics:

Polymer bulk density=0.490 g/cc (morphology spherical)
MIE=0.86g/10'
MIP=3.6g/10'
MIF=48.5g/10'
Swell (So@1025 l/sec)=345
Melt Strength (ETA* at G*=2kPa)=1.1E+05 poise

Example 2

Preparation of the Spherical $MgCl_2$—$H_2O$ Adduct

A spherical support made up of $MgCl_2$ and water was prepared according to the procedure disclosed in the example 1.

Preparation of the Solid Component

Into a 40l steel autoclave provided with stirrer, 35L of $TiCl_4$ were introduced together with 1750g of the spherical support prepared as described above at temperature of 0° C.

The slurry was heated and kept under stirring for 4.5h at 135° C. After that, under stirring, the temperature was lowered till to 90° C. and kept constant for further 30'.

Then the stirring was stopped and the liquid siphoned off of the reactor. Six hexane washings (2 at 60° C.+4 at 25° C.) were performed.

The spherical solid component was discharged and dried under vacuum at about 50° C. (1.670g of neat catalyst were recovered).

The composition of the solid was the following:

| Ti | 11.2% (by weight) |
| --- | --- |
| Mg | 15.2% (by weight) |
| Cl | 58.3% (by weight) |
| Solv. | 3.10% (by weight) |
| L.A. factor | 2.3 |

X RAY Pattern diffraction of the catalyst prepared in the example showed two different peaks at 2θ values of 48.3° and 50.0° respectively and one peak at 2θ values of 25.3°.

The so obtained catalyst was evaluated in HDPE polymerization according to the general slurry procedure obtaining 170 g of polymer having the following characteristics:
MIF=1.3g/10'
MIP=0.13g/10'
Bdp=0.346 (morphology Spherical)

Moreover, it was used in the general gas phase polymerization with the difference that in a 100 mL three neck glass flask were introduced in the following order, 20 mL of anhydrous hexane, 0.75g of TIBA, and 0.18g of the catalyst. They were mixed together and stirred at room temperature for 5 minutes and then introduced in the 1-L reactor maintained in a propane flow.

By using a propane overpressure, the activated catalyst was injected into the gas-phase reactor. The final pressure was about 23 bar, and it was kept constant during the polymerization at 95° C. for 120 minutes by feeding ethylene.

At the end, the reactor was depressurised and the temperature was dropped to 30° C. The collected polymer was dried at 70° C. under a nitrogen flow (140g obtained) and showed the following characteristics:
Polymer bulk density=0.456 g/cc (morphology spherical)
MIE=0.36g/10'
MIP=1.4g/10'
MIF=24.8g/10'
Die Swell (So@1025 l/sec)=336
Melt Strength (ETA* at G*=2kPa)=2.90E+05 poise

Example 3

Preparation of the Spherical $MgCl_2$—$H_2O$ Adduct

A spherical support made up of $MgCl_2$ and water was prepared according to the procedure disclosed in the example 1.

Preparation of the Solid Component

Into a 40l steel autoclave provided with stirrer, 32L of $TiCl_4$ were introduced together with 1200g of the spherical support prepared as described above at temperature of 0° C. The slurry was heated and kept under stirring for 4.5h at 135° C. After that, under stirring, the temperature was lowered till to 90° C. and kept constant for further 30'. Then the stirring was stopped and the liquid siphoned off of the reactor. Six hexane washings (2 at 60° C.+4 at 25° C.) were performed. The spherical solid component was discharged and dried under vacuum at about 50° C. (1.670 g of neat catalyst were recovered).

The composition of the solid was the following:

| Ti | 6.7% (by weight) |
| --- | --- |
| Mg | 18.6% (by weight) |
| Cl | 64.0% (by weight) |
| Solv. | 1.8% (by weight) |
| L.A. factor | 2.0 |

X RAY Pattern diffraction of the catalyst prepared in the example, showed two different peaks at 2θ values of 48.3° and 50.0° respectively.

The so obtained catalyst was evaluated in HDPE polymerization according to the general slurry procedure obtaining 170 g of polymer having the following characteristics:
MIF=3.4g/10'
MIP=0.22g/10'
Bdp=0.346 (morphology Spherical)

Example 4

Preparation of the Solid Component

A spherical support of formula $MgCl_2*3EtOH$ having an average size of about 46 µm., underwent a thermal treatment, under $N_2$ stream, over a temperature range of 50-150° C. until spherical particles having a residual alcohol content of about 24% (0.7 mole of alcohol for each $MgCl_2$ mole) were obtained.

Into a 2l glassware reactor provided with stirrer, 0.9 L of $TiCl_4$ at 0° C., 60 g of the support and 45 cc of $Ti(iPrO)_4$ were gently introduced.

The whole was heated to 135° C. over 150 minutes and these conditions were maintained for a further 5h. The stirring was interrupted and after 30 minutes the liquid phase was separated from the solid. Thereafter 6 washings with anhydrous hexane (0.9l) were performed two of which were carried out at 60° C. and four at room temperature.

After drying under vacuum at about 50° C., 103g of free flowing particles were recovered.

The solid showed the following characteristics:

| Ti | 18.5% (by weight) |
| --- | --- |
| Mg | 10.3% (by weight) |
| Cl | 53.7% (by weight) |
| OEt | 0.9% (by weight) |
| Oi-Pr | <0.1% (by weight) |

X RAY Pattern diffraction of the catalyst prepared in the example, showed two different peaks at 2θ values of 48.3° and 50.0° respectively.

Porosity measurements were performed according to the methodology described into the text and results are herewith reported:

| B.E.T. (SORPTOMATIC 1900) | | Porosimeter 2000 series (Hg) | | | |
|---|---|---|---|---|---|
| Porosity cc/g | Surface Area $m^2/g$ | Total Por. Cc/g | Total Surf. Area $m^2/g$ | Por. Up to 1 cc/g | Surf. Area up to 1 $m^2/g$ |
| 0.25 | 70.8 | 0.65 | 34.8 | 0.478 | 34.7 |

The catalyst obtained so far was evaluated in HDPE polymerization run according to the below reported test.
Ethylene polymerization (HDPE)
The test carried out according to the general procedure gave120 g of polymer having the following characteristics:
MIF=3.3g/10'
MIP=0.16g/10'
Bdp=0.314 (morphology Spherical)

Example 5

Preparation of the Spherical $MgCl_2$—$H_2O$ Adduct
A spherical support made up of $MgCl_2$ and water was prepared according to the procedure disclosed in the example 1.
Preparation of the Solid Component
Into a 40L steel autoclave provided with stirrer, 35L of $TiCl_4$ were introduced together with 1750g of the spherical support prepared as described above at temperature of 0° C. Then, keeping the same temperature, 210g of Hafnium Tetrachloride were introduced in the reactor. The slurry was heated and kept under stirring for 4.5h at 135° C.
Then the stirring was stopped and the liquid siphoned off of the reactor. Six hexane washings (2 at 60° C.+4 at 25° C.) were performed.
The spherical solid component was discharged and dried under vacuum at about 50° C. (1.670g of neat catalyst were recovered).
The composition of the solid was the following:

| Ti | 4.5% (by weight) |
|---|---|
| Hf | 5.9% (by weight) |
| Mg | 17.5% (by weight) |
| Cl | 60.0% (by weight) |
| Solv. | 1.4% (by weight) |
| L.A. factor | 2.1 |

X RAY Pattern diffraction of the catalyst prepared in the example (recorded according to the method described in the above text), showed two different peaks at 2θ values of 48.3° and 50.0° respectively.
The slurry polymerization test carried out according to the general procedure gave 130 g of polymer having the following characteristics:
MIF=2.8g/10'
Bdp=0.423 (morphology Spherical)
Gas-Phase Ethylene polymerization (HDPE)
The test was carried out according to the general procedure obtaining 140 g of polymer showing the following characteristics:
Polymer bulk density=0.472 g/cc (morphology spherical)
MIE=0.29g/10'
MIP=1.5g/10'
MIF=23.8g/10'
Swell (So@1025 1/sec)=287
Melt Strength (ETA* at G*=2kPa)=2.30E+05 poise

Example 6

Preparation of a Broad MWD PE in a Cascade polymerization Process
The polymerization process was carried out in a plant working continuously and basically equipped with a small reactor (pre-contacting pot) in which the catalyst components are mixed to form the catalytic system, a second vessel receiving the catalytic system formed in the previous step also equipped with mixing means, and two fluidized bed reactors (polymerization reactors) which are kept under fluidization conditions with propane.
The following reactants are fed to the pre-contacting pot:
the solid catalyst component prepared as described in example 3
liquid propane as diluent
a solution of aluminum alkyl compound
The temperature is in the range of 10-60° C. and the residence time (first and second vessel) ranges from 15 minutes to 2 hrs. In Table 1 specific experimental conditions used to test catalyst prepared in example 3 are summarized.
The so obtained catalytic system was directly fed from the pre-contacting section (first and second vessel) to the first gas-phase fluidized bed reactor operated at under the conditions reported in Table 2. The polymer produced in the first gas-phase reactor was then transferred to a second gas-phase reactor working under conditions reported in Table 3.
The polymer discharged from the final reactor was first transferred to the steaming section and then dried at 70° C. under a nitrogen flow and weighted. The polymer properties are reported in Table 4.

TABLE 1

| Pre-contacting | | | | | | |
|---|---|---|---|---|---|---|
| 1st Vessel | | | | | 2nd vessel | |
| Cat. (g/h) | $AlR_3$ type | $AlR_3$/Cat. (g/g) | Time (min) | T (° C.) | Time (min) | T° (° C.) |
| 16 | Tiba | 5 | 40 | 50 | 27 | 50 |

TABLE 2

| First Fluidized bed reactor | | | | | |
|---|---|---|---|---|---|
| $C_2^-$ (mol %) | $H_2/C_2^-$ (mol | Time (hr) | P barg | T (° C.) | Production (Kg/h) |
| 15 | 1.4 | 1.5 | 24 | 75 | 30.1 |

TABLE 3

| continued Second Fluidized-bed reactor | | | | | | |
|---|---|---|---|---|---|---|
| Time (hr) | T (° C.) | P barg | $C_2H_4$ (mol %) | $H_2/C_2^-$ (mol) | C6- (g/h) | Production (Kg/h) |
| 2.3 | 95 | 24 | 23 | 0.072 | 150 | 60.9 |

TABLE 4

| Final polymer | |
| --- | --- |
| MIF (g/10') | 6.8 |
| MIF/MIP | 30.0 |
| Bulk Density (Kg/dm$^3$) | 0.489 |
| Hdpe AVRG size micron | 1033 |
| Fines <180 micron wt % | 0.2 |
| Effective Density g/cc | 0.9551 |
| Swell (So@1025 1/sec) | 270 |
| Melt Strength (ETA* at G* = 2 kPa) | 2.0E+06 |

The invention claimed is:

1. A catalyst comprising:
a catalyst component comprising, Mg, a Ti compound has the formula Ti(OR$^{III}$)$_n$X$_{4-n}$, and an halogen atom, wherein n is a number comprised between 0 and 1 inclusive, R$^{III}$ is an alkyl, cycloalkyl or aryl radical having 2-8 carbon atoms and X is halogen
wherein:
(a) the Ti atoms are present in an amount higher than 4% based on the total weight of the catalyst component,
(b) the amount of Mg and Ti atoms is such that the Ti/Mg molar ratio is lower than 1,
(c) an X-ray diffraction spectrum, wherein in the range of 2θ diffraction angles between 47.0° and 52.0°, at least two diffraction peaks are present at diffraction angles 2θ of 48.0 ±0.2°, and 50.2±0.2°, and
(d) wherein the Ti compound is combined with TiOCl$_2$.

2. The catalyst according to claim 1 wherein the most intense diffraction peak is the one at 2θ of 50.0±0.2°.

3. The catalyst according to claim 1 wherein the intensity of the diffraction line at 48.0±0.2° is less than 0.8 times the intensity of the most intense diffraction line.

4. The catalyst according to claim 1 wherein the Ti/Mg molar ratio is at most 0.9.

5. The catalyst according to claim 1 wherein the amount of titanium atoms is higher than 4.5%.

6. The catalyst according to claim 1 wherein more than 80% of the titanium atoms are in a +4 valence state.

7. The catalyst according to claim 1 wherein an "LA" factor is higher than 0.5, where LA is the molar equivalent of anionic species lacking in order to satisfy all the molar equivalents of the cations present in the solid catalyst component which have not been satisfied by the total molar equivalent of the anions present in the solid catalyst component, all of the molar equivalents of anions and cations being referred to the Ti molar amount.

8. The catalyst according to claim 1, wherein the Ti compound is TiCl$_4$.

9. The catalyst according to claim 1 wherein the Ti compound is TiCl$_3$OEt.

10. The catalyst according to claim 1 further comprising Hf derivatives of formula Hf(OR$^V$)$_n$X$_{4-n}$, wherein n is a number comprised between 0 and 1 inclusive, R$^V$ is an alkyl, cycloalkyl or aryl radical having 2-8 carbon atoms and X is halogen.

11. A catalyst according to claim 1 comprising the reaction product between the catalyst component and an organo-Al compound.

12. The catalyst system according to claim 11 wherein the organo Al-compound is an Al-trihydrocarbyl compound.

13. The catalyst system according to claim 1 further comprising an external donor.

14. The catalyst system according to claim 13 wherein the external donor is selected from those of the following formula:

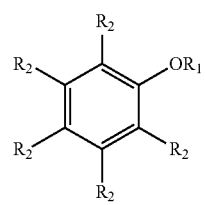

(I)

wherein:
R$_2$, equal to or different from each other, are hydrogen atoms or C$_1$-C$_{20}$ hydrocarbon radicals optionally containing heteroatoms belonging to groups 13-17 of the periodic table of the elements or alkoxy groups of formula —OR$_1$, two or more of the R$_2$ groups can be connected together to form a cycle; R$_1$ are C$_1$-C$_{20}$ hydrocarbon radicals optionally containing heteroatoms belonging to groups 13-17 of the periodic table of the elements.

15. A process for the polymerization of ethylene carried out in the presence of at catalyst comprising:
(i) a catalyst component comprising, Mg, a Ti compound has the formula Ti(OR$^{III}$)$_n$X$_{4-n}$, and an halogen atom, wherein n is a number comprised between 0 and 1 inclusive, R$^{III}$ is an alkyl, cycloalkyl or aryl radical having 2-8 carbon atoms and X is halogen; and
(ii) the reaction product between the catalyst component and an organo-Al compound,
wherein:
(a) the Ti atoms are present in an amount higher than 4% based on the total weight of the catalyst component,
(b) the amount of Mg and Ti atoms is such that the Ti/Mg molar ratio is lower than 1,
(c) an X-ray diffraction spectrum, wherein in the range of 2θ diffraction angles between 47.0° and 52.0°, at least two diffraction peaks are present at diffraction angles 2θ of 48.0±0.2°, and 50.2±0.2°, and
(d) wherein the Ti compound is combined with TiOCl$_2$.

* * * * *